United States Patent [19]
Selden et al.

[11] Patent Number: 5,425,075
[45] Date of Patent: Jun. 13, 1995

[54] MULTIPURPOSE ANALOG TELEPHONY CHANNEL TEST FACILITY METHOD AND APPARATUS

[75] Inventors: Brian T. Selden, Santa Clara; Jack G. S. Lum, Sunnyvale, both of Calif.

[73] Assignee: Rolm Company, Santa Clara, Calif.

[21] Appl. No.: 105,787

[22] Filed: Aug. 12, 1993

[51] Int. Cl.[6] ................. H04M 1/24; H04M 3/08; H04M 3/22
[52] U.S. Cl. ...................... 379/10; 379/12; 379/2; 379/15
[58] Field of Search .............. 379/1, 2, 6, 10, 12, 379/15, 27, 29, 22; 380/13, 15

[56] References Cited

U.S. PATENT DOCUMENTS

| | | | |
|---|---|---|---|
| 4,317,967 | 3/1982 | DeVries et al. | 179/175 |
| 4,451,708 | 5/1984 | Kemler et al. | 179/98 |
| 4,631,368 | 12/1986 | Fisler | 379/29 |
| 4,794,632 | 12/1988 | Burton et al. | 379/29 X |
| 5,001,741 | 3/1991 | Sayer | 379/12 |
| 5,123,041 | 6/1992 | Brinkmoeller | 379/21 |
| 5,146,474 | 9/1992 | Nagler et al. | 370/15 X |

*Primary Examiner*—Stephen Chin
*Assistant Examiner*—Paul Loomis

[57] ABSTRACT

A method and apparatus for determining whether a telephony system malfunction is caused by defective telephone company trunk lines connected thereto, or caused by defective system equipment. The present invention comprises two double pole double throw relays having connections arranged whereby a pair of telephony equipment interface channels have multiple remote testing capabilities. The present invention performs trunk rolling and/or inter-channel loop back testing under local or remote control.

14 Claims, 7 Drawing Sheets

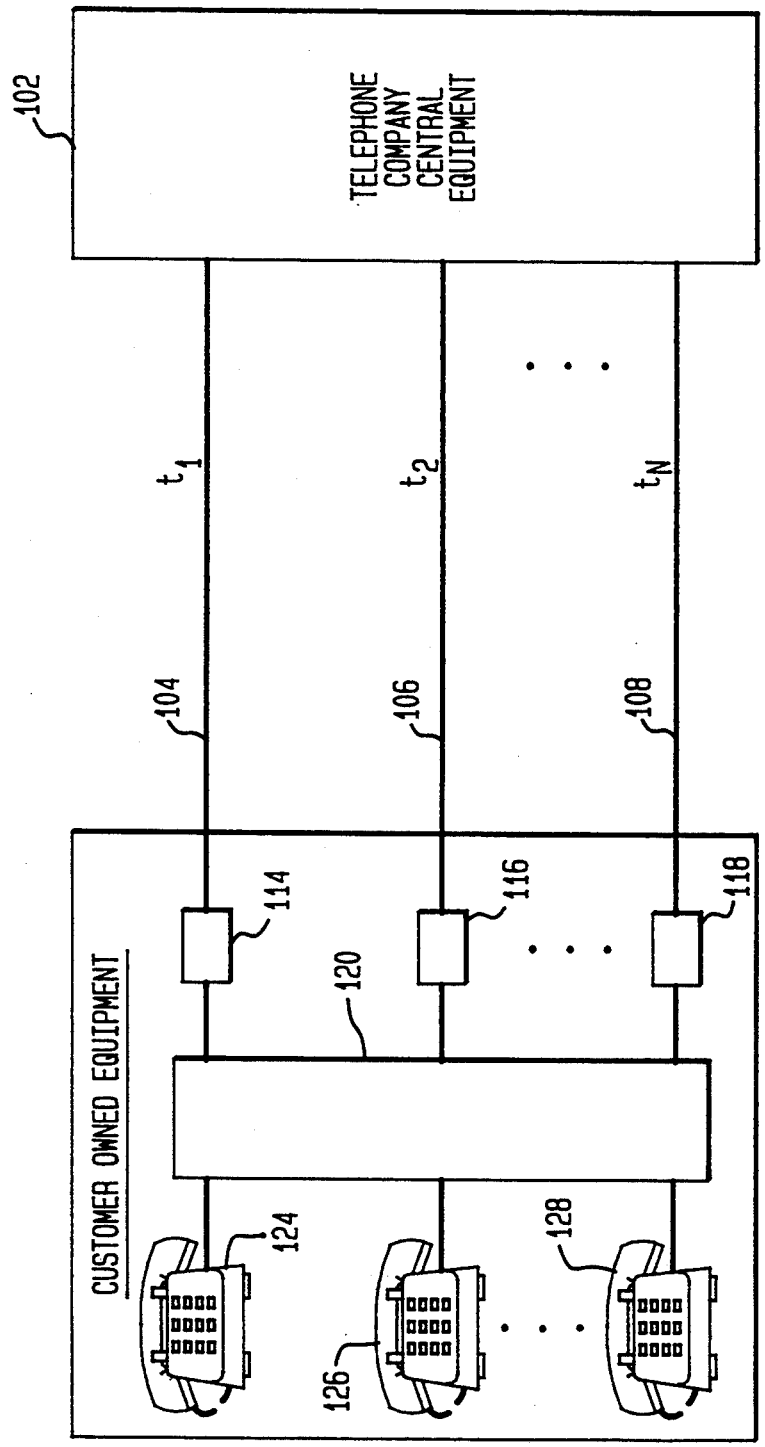

MULTIPURPOSE ANALOG TELEPHONY CHANNEL TEST FACILITY METHOD AND APPARATUS

FIELD OF THE INVENTION

The present invention generally relates to telecommunications equipment and, in particular, relates to a method and apparatus for determining whether a fault occurring in a telephony system is caused by telephone company-owned equipment or customer-owned equipment.

DESCRIPTION OF THE RELATED TECHNOLOGY

Since deregulation of the telephone industry, telephone customers have found it advantageous and cost effective to purchase, install and maintain their own telephone equipment such as, for example, private branch exchange (PBX) and key system (KSU) equipment. Telephone customers now may own their telephone sets, in office wiring and PBX or KSU systems, however, the customer-owned equipment must still be connected to the local telephone company equipment by means of interconnections called "trunk lines". The telephone company trunk lines connect the telephone company central station equipment to the telephone customer-owned PBX or KSU equipment.

When there is trouble in using the telephone system, including the leased telephone trunk lines and the customer-owned equipment, such trouble does not necessarily lie with the telephone company. There is the possibility that the trouble with the telephone system may be caused by the customer-owned equipment. The customer is faced with a dilemma, who is responsible for fixing the problem with the telephone system. If the customer calls the telephone company to report the trouble and the trouble is actually with the customer's own equipment, the customer must pay for two service calls. The telephone company charges for service calls when the problem is not with telephone company-owned equipment. In addition, the proper service technician must then be called to repair the actual problem, the customer's own equipment. If the non-telephone company service technician is called first and the problem is with the telephone company-owned equipment, an unnecessary service call charge still results. Either repair scenario may result in wasted money and time if an incorrect assumption of the problem is made.

What is needed when a problem arises, with a telecommunications system having shared repair responsibility, is the ability to easily and quickly isolate the problem with a high degree of certainty. A system and method to determine with a high degree of certainty the nature of the problem, enables the proper repair services to be requested without the loss of money and time resulting from incorrect assumptions. The preferred method to isolate a problem is by remotely diagnosing the system, and after the remote diagnose is analyzed, dispatching the appropriate service technician.

Remote testing diagnostics presently in use have been modeled to replicate tests which normally would be performed manually by service technicians at a telecommunications site. One commonly employed trouble shooting technique is to isolate voice channel problems between the customer-owned PBX equipment and the telephone company trunk lines connected thereto by physically interchanging two trunk lines, one being connected to the problematic channel and the other to a known good channel. If the problem remains on the problematic channel then the fault is with the customer-owned PBX equipment. If the problem goes away, however, then the telephone company-owned equipment is at fault. This test is known in the telephone industry as "trunk rolling".

Circuitry to facilitate trunk rolling is illustrated in FIG. 1a. Channel '1' and channel '2' are connected to trunk '1' and trunk '2', respectively the normally closed contacts of a four pole double throw (4PDT) relay. When the 4PDT relay is energized by a control signal then trunks '1' and '2' are rolled wherein channel '1' is connected to trunk '2' and channel '2' is connected to trunk '1'. Trunk rolling, however, must rely on conducting the equipment testing through the telephone network. What is sometimes preferable is to test the equipment using stand-alone testing which avoids the possibility of network problems confusing the test results.

A stand-alone test diagnostic, widely used in the telephone industry that avoids the trunk rolling problems, is to disconnect the trunk line and attach a network simulator or a parametric analyzer in its place. Through this specialized equipment, the channel in question can be thoroughly diagnosed. Previous remote diagnostic methods that attempted to accomplish similar results as the aforementioned manual tests, were intra-channel loopbacks (loopback of test signals internal to a single channel) and switching the channel in question to a master shared resource test circuit.

The test using intra-channel loopbacks on telephones having two wire analog interfaces has two drawbacks. The first drawback is that in order to properly isolate the PBX equipment and the trunk line, the loopback function must be performed as close as possible to the PBX equipment under test. Presently, analog loopbacks occur only midway through a voice channel circuit. The second drawback to intra-channel loopbacks is that only a small portion of the channel's functionality can be tested.

As mentioned above, using a shared test circuit overcomes the inherent problems associated with intra-channel loopback testing. The shared test circuit allows for introducing a test signal directly into the input of the voice channel in question. In addition, the shared test circuit may be designed to cover a wider range of channel functionality such as, for example, network signaling. The main drawback to providing a shared test circuit for customer-owned PBX equipment is the increased cost and complexity of the hardware necessary for implementation. Thus, shared test circuits are usually only provided for critical applications such as central office telephone equipment where reliability testing is mandated by government regulation.

U.S. Pat. Nos. 4,317,967 and 4,631,368 illustrate shared test circuits that are manually controlled during testing of a telecommunications system by a technician or telephone equipment owner for verification and localization of a system problem. Both patents teach the use of a special test panel having a telephone instrument or provisions therefor. Each device described therein can isolate a fault as to whether it is the telephone company's responsibility or the customer's problem. Doing so, however, requires much circuit complexity and test procedures, and must be performed at the site of the telephone equipment.

What is needed for customer-owned telephony systems is an analog telephony channel testing system and method which allows a pair of telephony equipment analog channels multiple remote testing capabilities. The ability to remotely test the system utilizing "trunk rolling" and an on-board loopback test in a cost effective and simple manner is most desirable.

SUMMARY OF THE INVENTION

It is therefore an object of the present invention to allow for a more complete and greater range of tests than the intrachannel loopbacks but cost substantially less than having a separate master test circuit and associated circuitry thereto. By using a known good voice channel to test a channel under question (inter-channel loopback), only minimal additional circuitry is required to connect together the two channels. By using a portion of the switching circuitry which performs a "trunk rolling" feature, additional testing capabilities are accomplished by the present invention at very little additional cost. Thus, the present invention performs both trunk rolling and interchannel loopback tests at substantially no extra cost.

A preferred embodiment of the present invention comprises two independently controlled double-pole-double-throw (DPDT) relays having the relay switch poles connected to the customer-owned equipment channel-pair. These relays are arranged in a specific circuit topology which allows for a pair of telephony equipment analog channels to have multiple remote testing capabilities. The two main test capabilities provided by the system and method of the present invention are a remote "trunk rolling" ability and an inter-channel loopback/test ability.

The independently controllable DPDT relays may be activated together or separately. When a single relay is activated, two telephony channels are placed in parallel. This allows one channel to test the other channel in a loopback fashion with respect to the telephony equipment. The DPDT relays of the present invention are positioned at the point where the network trunks meet the voice channels on the customer-owned telephony equipment interface card. By interconnecting the channels at these points, the inter-channel card edge loopback tests the entire path of each of the customer-owned equipment channels.

Effectively, with one relay activated, both channels are connected to one of the incoming telephone company trunk lines. The other trunk line is disconnected. Typically, the known good trunk line is the one connected to the two channels in parallel, and the questionable trunk line is the one disconnected by activation of the relay. Having a known good trunk line allows for various tests to be made on either of the parallel connected channels. If both channels tested show no problems, then the disconnected trunk line is suspect.

Verification of the suspected trunk line is performed by activating the second relay which effectively interchanges the known good trunk line with the questionable trunk line by connecting the questionable trunk line to the known good channel input. In this manner, determination of who is responsible to fix the problem may be easily determined through inexpensive, remotely controlled tests.

The system and method of the present invention may also be utilized in testing telephony equipment during manufacture where there are no telephone company trunk lines available.

Other and further objects, advantages and features of the present invention will be apparent from the following description of a presently preferred embodiment of the invention, given for the purpose of disclosure and taken in conjunction with the accompanying drawings.

BRIEF DESCRIPTION OF THE DRAWINGS

FIG. 1 is a schematic block diagram of a telephony system;

DETAILED DESCRIPTION OF THE PREFERRED EMBODIMENT

Figure 1A:
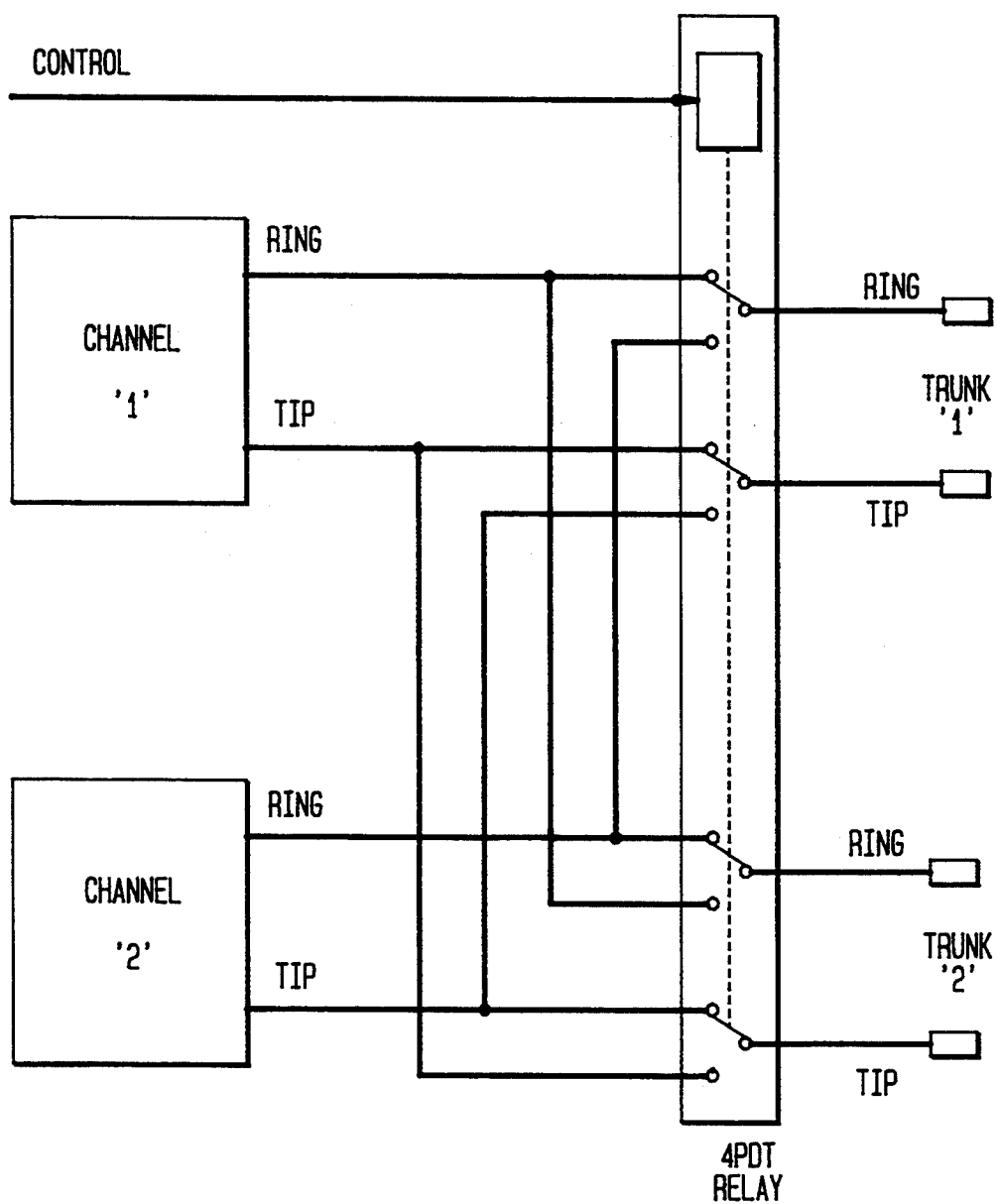
FIG. 1a is a schematic block diagram of a prior art configuration for trunk rolling.

Referring now to the drawings, a general system overview is illustrated in FIG. 1 and the details of the preferred embodiment are schematically illustrated in the subsequent drawings. In the drawings, the letter S designates generally a multipurpose analog channel telephony test system used in conjunction with customer-owned telephony equipment connected to a plurality of telephone company trunk lines. Like elements in the drawings have like numbers, and similar elements in the drawings have like numbers and different lower case letter suffixes.

Referring to FIG. 1, a typical analog telephony communications system is illustrated in schematic block diagram. The telephone company central equipment 102 receives and sends telephone calls over trunk lines 104, 106, 108, etc. Customer-owned equipment 112 interfaces with the telephone company trunk lines 104–108. The equipment 112 comprises channel interfaces 114, 116 and 118; a control and switching means 120, and individual station telephone sets 124, 126 and 128.

When a call originates from the central equipment 102 over the trunk line 104, channel interface 114 detects and connects the incoming call to the control and switching means 120 which in turn directs the incoming call to the appropriate telephone station such as, for example, telephone set 124. In similar fashion, switching means 120 may direct an incoming call from trunk line 106 or line 108 to any one of telephone set 126 or telephone set 128.

When a call originates from a telephone set such as, for example, the telephone set 126, the control and switching means 120 directs the outgoing call to an unused trunk line such as, for example, the trunk line 106 through the respective channel interface 116. Similarly, telephone set 124 and telephone set 128 may be directed to any unused trunk line such as the trunk 104 or the trunk 108 through channel interfaces 114 or 118, respectively.

Normally, incoming and outgoing calls are handled without problem so long as there are enough trunk lines to handle all of the calls occurring at any one time. When the number of calls exceed trunk line capacity, a busy signal occurs. Thus, any combination of telephone sets and trunk lines may be connected together so long as there is enough trunk line capacity to handle all of the desired calls.

Figure 2:
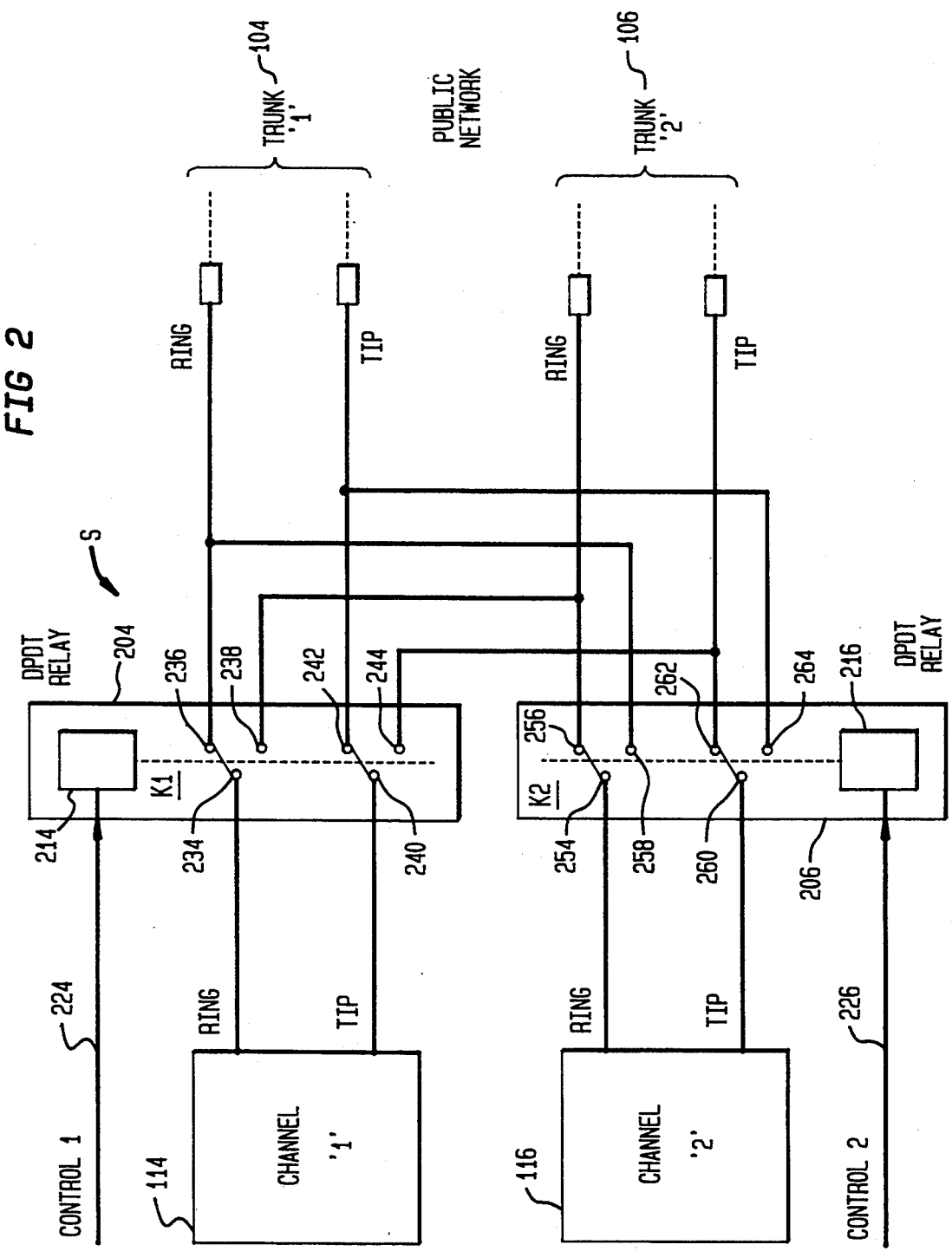
FIG. 2 is a schematic block diagram of the preferred embodiment of the present invention.

Referring now to FIG. 2, a test system S is illustrated in schematic block diagram. System S comprises first and second double pole double throw relays 204 and 206, respectively, and customer-owned telephony equipment channels 114 and 116. The channel interfaces 114 and 116 are connected through the relays 204 and 206 to the trunk lines 104 and 106. Relays 204 and 206 have contact actuation coils 214 and 216, respectively. Control signals 224 and 226 actuate the respective coils 214 and 216.

Each of relays 204 and 206 has a set of double pole double throw contacts. These contacts are arranged to interconnect the channel interfaces 114 and 116 to the trunks 104 and 106, to connect the interfaces 114 and 116 in parallel, and to interchange trunks 104 and 106.

Figure 3:
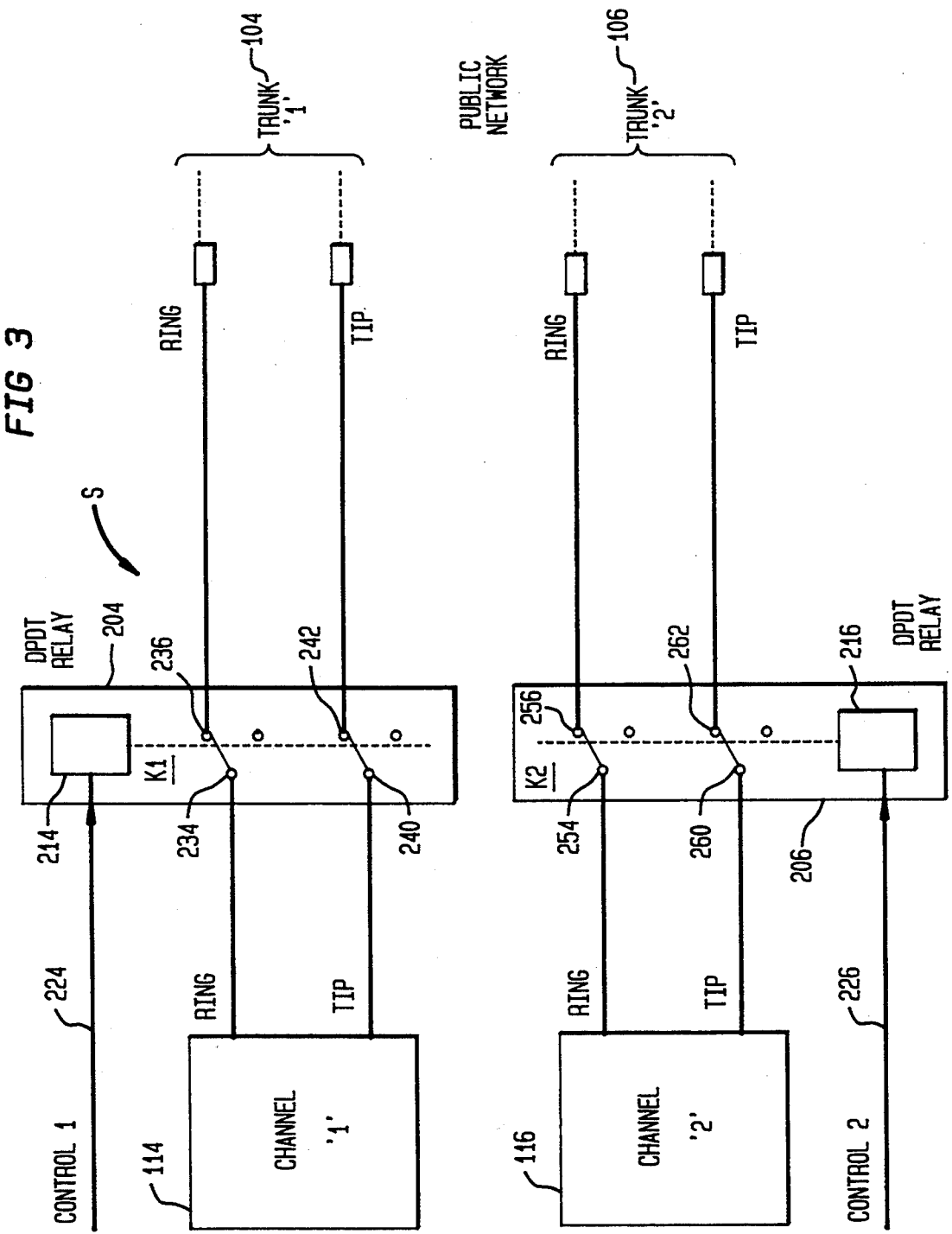
FIG. 3 is a partial schematic block diagram of FIG. 2.

Referring now to FIG. 3, a partial schematic block diagram of FIG. 2 is illustrated. When relays 204 and 206 are both de-energized, trunks 104 and 106 are connected to channel interfaces 114 and 116, respectively. Relay 204 contacts 234 and 236 connect together, as do contacts 240 and 242. Similarly, relay 206 contacts 254 and 256 connect together, as do contacts 260 and 262. As long as coils 214 and 216 are not energized by signals 224 and 226, the relays 204 and 206 maintain the aforementioned contact configurations.

The un-energized coils 214 and 216 configuration results in the connections for the normal mode of operation for a customer-owned telephony system. When a problem develops within the interface channel 114 and trunk line 104, then a determination must be made as to whether the telephone company must repair its equipment or the telephone customer is responsible for repairs.

Figure 4:
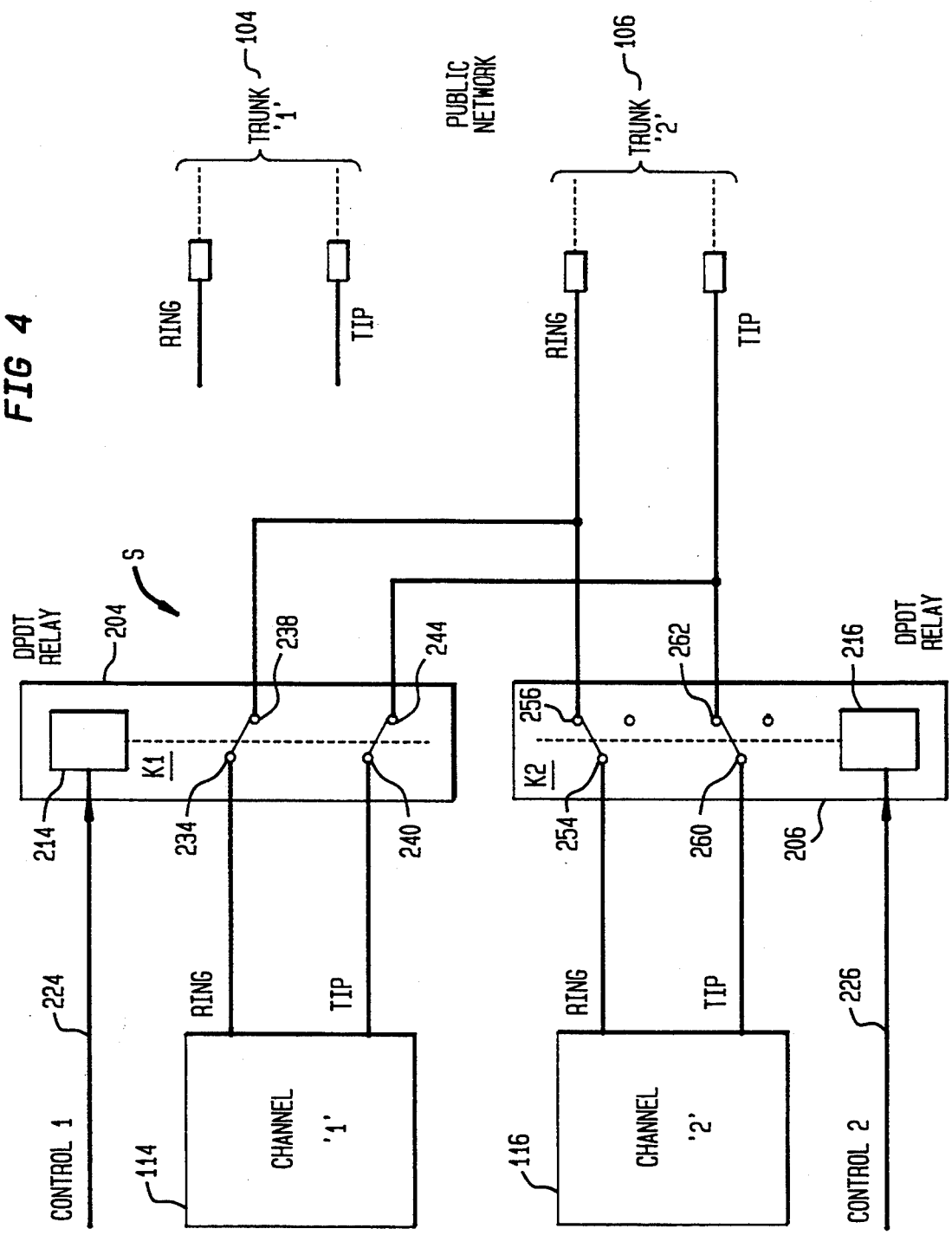
FIG. 4 is a partial schematic block diagram of FIG. 2.

For exemplary purposes, assume that a problem exists with the trunk line 104 and interface channel 114. The system and method of the present invention may actuate relay 204, thus, disconnecting trunk line 104 from the interface channel 114. Referring to FIG. 4, a partial schematic block diagram of FIG. 2 is illustrated. Relay 204 coil 214 is energized by control signal 224. Coil 214 causes contacts 234 and 240 to connect to contacts 238 and 244, respectively. This contact configuration effectively places both interface channels 114 and 116 in parallel. Both interface channels 114 and 116 are connected to trunk line 106.

Interface channel 116 may now test questionable interface channel 114. Various voice and signaling tests may be performed on channel 114 through known good channel 116. If channel 114 is found to be functional after all tests are run, then the trunk line 104 becomes suspect. The questionable trunk line 104 may now be tested with known good channel 116 by energizing relay 206 coil 216 by means of control signal 226. In addition, the interface channel 114 may be verified as working with known good trunk line 106 when relay 204 coil 214 is energized by control signal 224.

Figure 5:
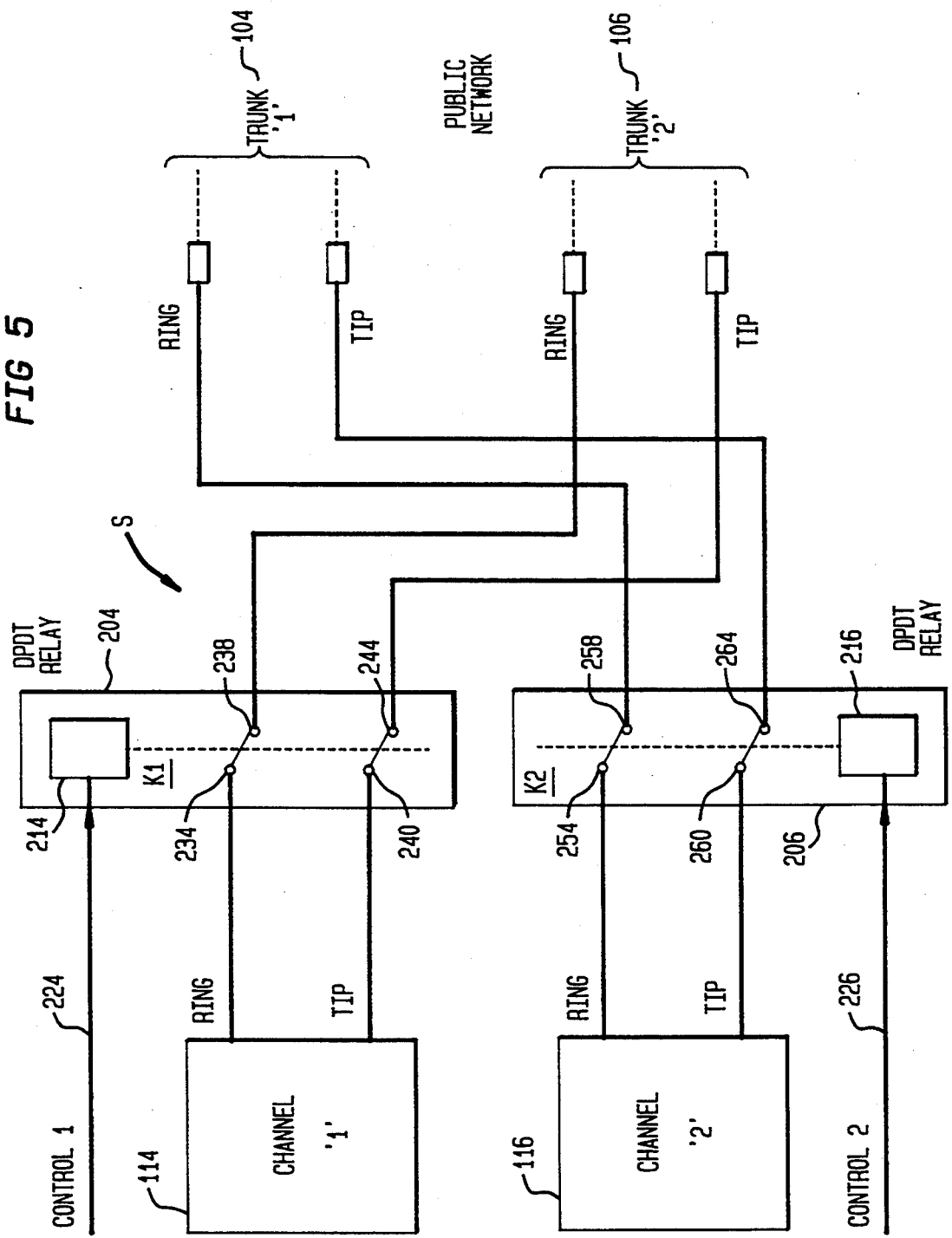
FIG. 5 is a partial schematic block diagram of FIG. 2.

Referring now to FIG. 5, a partial schematic block diagram of FIG. 2 is illustrated. The questionable trunk line 104 is directly connected to known good channel 116 and the known good trunk line 106 is directly connected to most likely good channel 114. If the combination of channel 114 and trunk line 106 functions properly, channel 114 is not defective as indicated in the test above. Therefore, if known good channel 116 does not function properly when connected to questionable trunk line 104, then the system problem has been isolated to the telephone company's equipment and, therefore, the telephone company has responsibility for repair. Relay 204 contacts 234 and 240 are connected to contacts 238 and 244, respectively, when the coil 214 is energized by the control signal 224. Relay 206 contacts 254 and 260 are connected to contacts 258 and 264, respectively, when the coil 216 is energized by the control signal 226.

Figure 6:
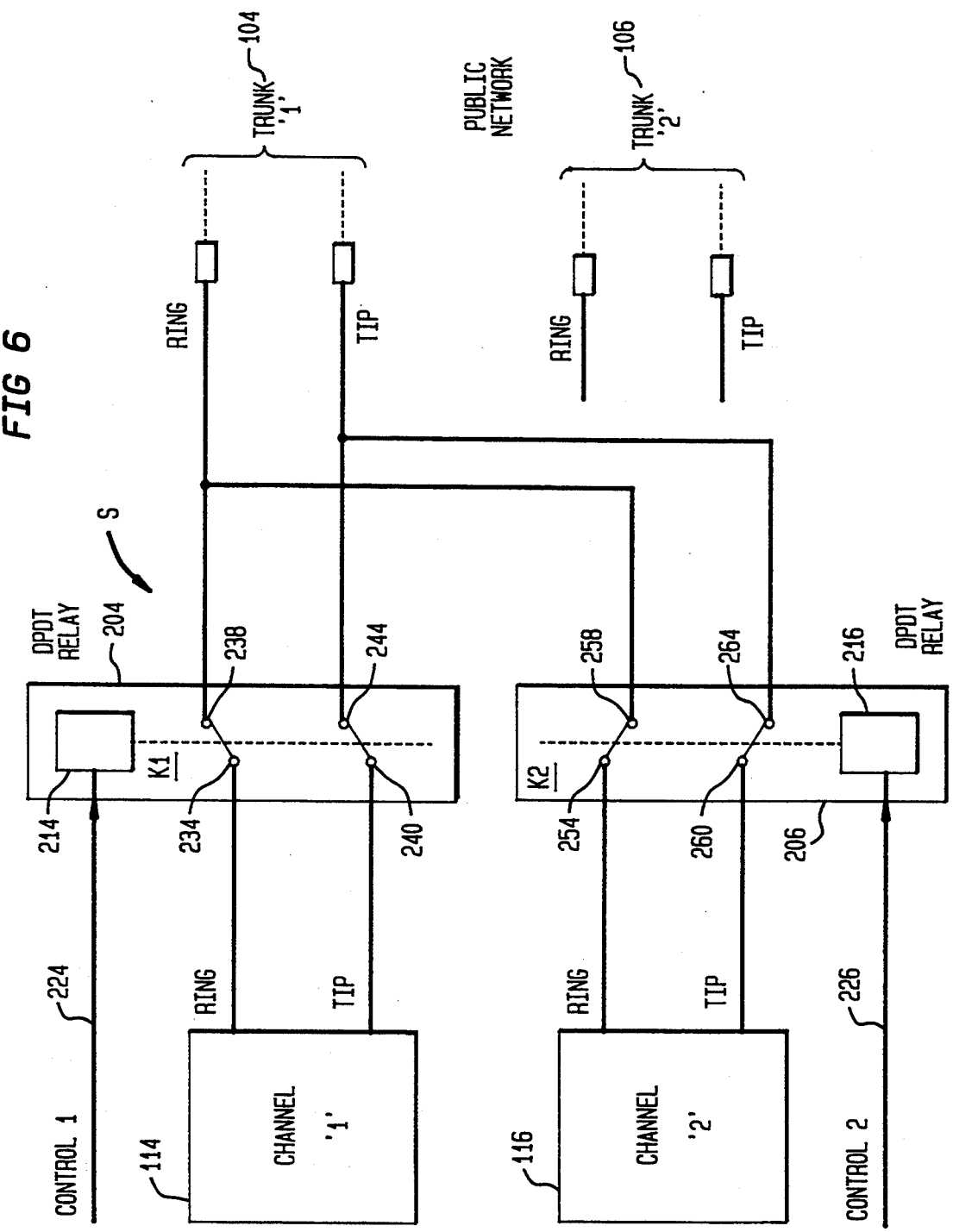
FIG. 6 is a partial schematic block diagram of FIG. 2.

In similar fashion, the trunk line 106 and interface channel 116 may be tested by energizing coil 216 of the relay 206. Referring to FIG. 6, a partial schematic block diagram of FIG. 2 is illustrated. When relay 206 coil 216 is energized by control signal 226, channels 114 and 116 are connected in parallel to trunk line 104. Relay 206 contacts 254 and 260 are connected to contacts 258 and 264, respectively, when the coil 216 is energized by the control signal 226. The system and method of the present invention may now test both of the customer-owned equipment channels 114 and 116. If both channels 114 and 116 are found to be operational, then the trunk 106 is suspect to being defective.

Defective operation of the trunk line 106 may be verified by energizing relay 204 coil 214 by control signal 224 as illustrated in FIG. 5. When both relays 204 and 206 are energized, the trunk lines 104 and 106 are interchanged, and verification of known good customer-owned equipment with a known good and a questionable trunk line may be evaluated as described above.

It is not essential to have one good trunk line for conducting accurate fault isolation testing with the present invention. In the event that both trunk lines are bad, but both customer-owned equipment channels are good, it can be verified by performing an inter-channel loopback test and be able to prove with a high degree of confidence that the malfunctions are caused by the external trunk lines.

The above described functional tests of a telephony system may be remotely performed by a service technician or technically informed equipment owner. After the above mentioned tests have been performed and evaluated, a decision as to whom to call to repair the problem may be made with a high degree of certainty. The system and method of the present invention may also be utilized during manufacturing tests and system installation and start up of a new telephony system.

The preferred embodiment of the present invention has been illustrated utilizing mechanical relays, however, one skilled in the art of telephony and signal processing will readily appreciate that solid state semiconductor devices such as field effect transistors, solid state relays and other switching means well known in the art of electronics, may be utilized in the present invention. The system and method of the present invention, therefore, is well adapted to carry out the objects and attain the ends and advantages mentioned, as well as others inherent therein. While a presently preferred embodiment of the invention has been given for purposes of disclosure, numerous changes in the details of construction, interconnection and arrangement of parts will readily suggest themselves to those skilled in the art, and which are encompassed within the spirit of the invention and the scope of the appended claims.

What is claimed is:

1. An apparatus for a telephony system including a plurality of trunk interfaces and a plurality of trunk lines, the apparatus being operative to enable the testing of said trunk interfaces and said trunk lines, the apparatus comprising:

a plurality of switching means connecting the plurality of trunk interfaces to the plurality of trunk lines, each switching means being independently controllable and having a first and second mode; and each switching means connecting a given trunk interface with a given trunk line when in the first mode and connecting the given trunk interface with an alternative trunk line when in the second mode, wherein the given trunk interface and trunk line can be tested by switching between the first and second mode.

2. An apparatus for enabling the testing of a telephony system, comprising:

first and second switching means adapted for connection between first and second telephone trunk lines, and first and second telephone equipment trunk interfaces;

said first and second switching means, each having switchable first and second states, and each independently switchable therebetween;

when said first and second switching means are each in the first state, the first and second telephone trunk lines are connected to the first and second trunk interfaces, respectively;

when said first switching means is in the second state and said second switching means is in the first state, the second trunk line is connected to both of the first and second trunk interfaces, and the first and second trunk interfaces are connected in parallel;

when said first and second switching means are each in the second state, the second and first telephone trunk lines are connected to the first and second trunk interfaces, respectively; and when said first switching means is in the first state and said second switching means is in the second state, the first trunk line is connected to both of the first and second trunk interfaces and the first and second trunk interfaces are connected in parallel.

3. The apparatus of claim 2, wherein each of the switching means comprises a relay solenoid coil actuator including a relay having double pole double throw contacts and a solenoid coil actuator for switching the contacts between the first and second states.

4. The apparatus of claim 2, wherein the relay solenoid coil actuator is adapted for receiving a remote control signal.

5. The apparatus of claim 2, wherein each of the switching means is a switch having double pole double throw contacts.

6. The apparatus of claim 2, wherein each of the switching means comprises solid state semiconductor devices.

7. The apparatus of claim 6, wherein the semiconductor devices are field effect transistors.

8. The apparatus of claim 6, wherein the semiconductor devices are solid state relays.

9. The apparatus of claim 2, further comprising said first and second switching means attached to and an integral part of the first and second trunk interfaces.

10. The apparatus of claim 4, further comprising a remotely controllable control means having first and second control signals for controlling the solenoid coil actuators of said first and second switching means, respectively.

11. A telephony system having means for enabling the testing of said system by remote control to determine whether a malfunction is due to the telephone system or to telephone company trunk lines connected thereto, said system comprising:

a plurality of pairs of switching means, each one of the pairs having independently switchable first and second states, said plurality of pairs of switching means adapted for connection to a corresponding plurality of telephone company trunk lines;

a plurality of trunk line interfaces, said plurality of trunk line interfaces connected to said plurality of pairs of switching means;

a control means for controlling said trunk line interfaces, said control means connected to said trunk line interfaces for connection to a plurality of telephone station sets;

a remotely controllable means for controlling the states of said switching means; and where the remotely controllable switching means connects two of the plurality of trunk line interfaces together in parallel in order to enable testing of both of said trunk line interfaces, said remotely controllable switching means being further operative to transpose two of the corresponding telephone company trunk lines in order to enable testing of said two telephone company trunk lines.

12. A method for testing a telephony system to determine whether a malfunction is due to the telephone system or to telephone company trunk lines connected thereto, said method comprising the steps of:

connecting two trunk line interfaces together in parallel and connecting said parallel connected interfaces to a known good trunk line;

using one of said two interfaces to determine whether the other of said two interfaces is a good interface in order to provide a good known trunk line interface;

connecting a suspected telephone company trunk line to the known good interface;

testing the suspected trunk line with the known good trunk line interface for determining whether the suspected trunk line in functional;

connecting a suspected trunk line interface to the known good trunk line;

testing the suspected trunk line interface with the known good trunk line; and determining whether the suspected trunk line interface or the suspected trunk line is defective.

13. The method of claim 12, wherein the steps of connecting and testing are done by remote control.

14. The method of claim 12, further comprising the steps of:

interchanging the suspected trunk line and the known good trunk line which are connected to the suspected interface and the known good interface, respectively, so that the suspected trunk line and the known good trunk line are connected to the known good interface and the suspected interface, respectively;

where, if the malfunction remains with the suspected trunk line, then the malfunction is the responsibility of the telephone company or, if the malfunction remains with the suspected interface, then the malfunction is in the telephony system.

* * * * *

UNITED STATES PATENT AND TRADEMARK OFFICE
CERTIFICATE OF CORRECTION

PATENT NO. : 5,425,075
DATED : June 13, 1995
INVENTOR(S) : Selden et al.

It is certified that error appears in the above-indentified patent and that said Letters Patent is hereby corrected as shown below:

On the front page of the patent, line 73, Assignee should read "Rolm Company, Santa Clara, California".

Signed and Sealed this

Eighteenth Day of June, 1996

Attest:

BRUCE LEHMAN

Attesting Officer     Commissioner of Patents and Trademarks